Nov. 7, 1944.    W. R. COYNE    2,362,191
DOUGHNUT MACHINE
Filed April 5, 1943    2 Sheets-Sheet 2
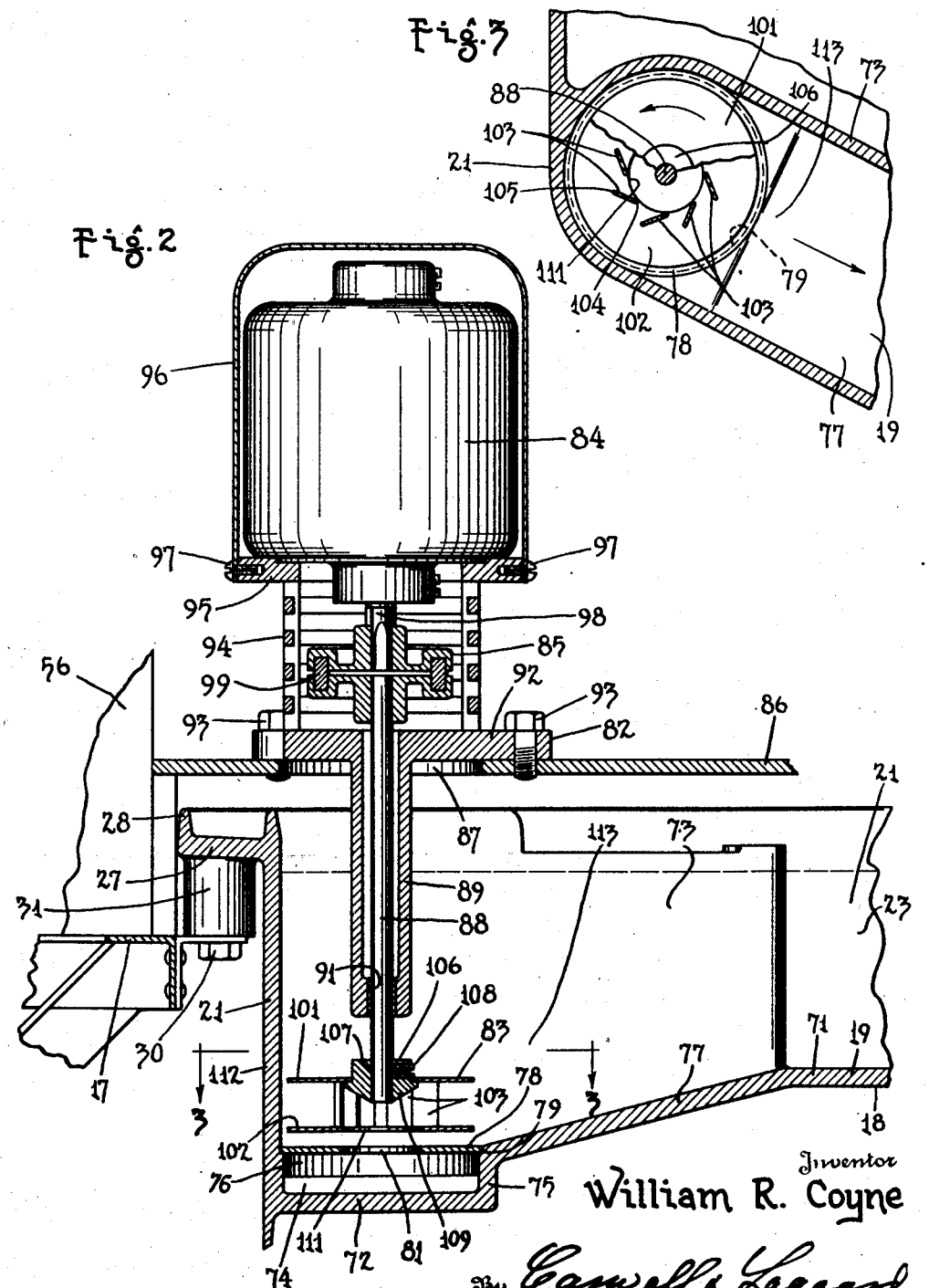
Inventor
William R. Coyne
By Caswell & Lagaard
Attorneys Patented Nov. 7, 1944

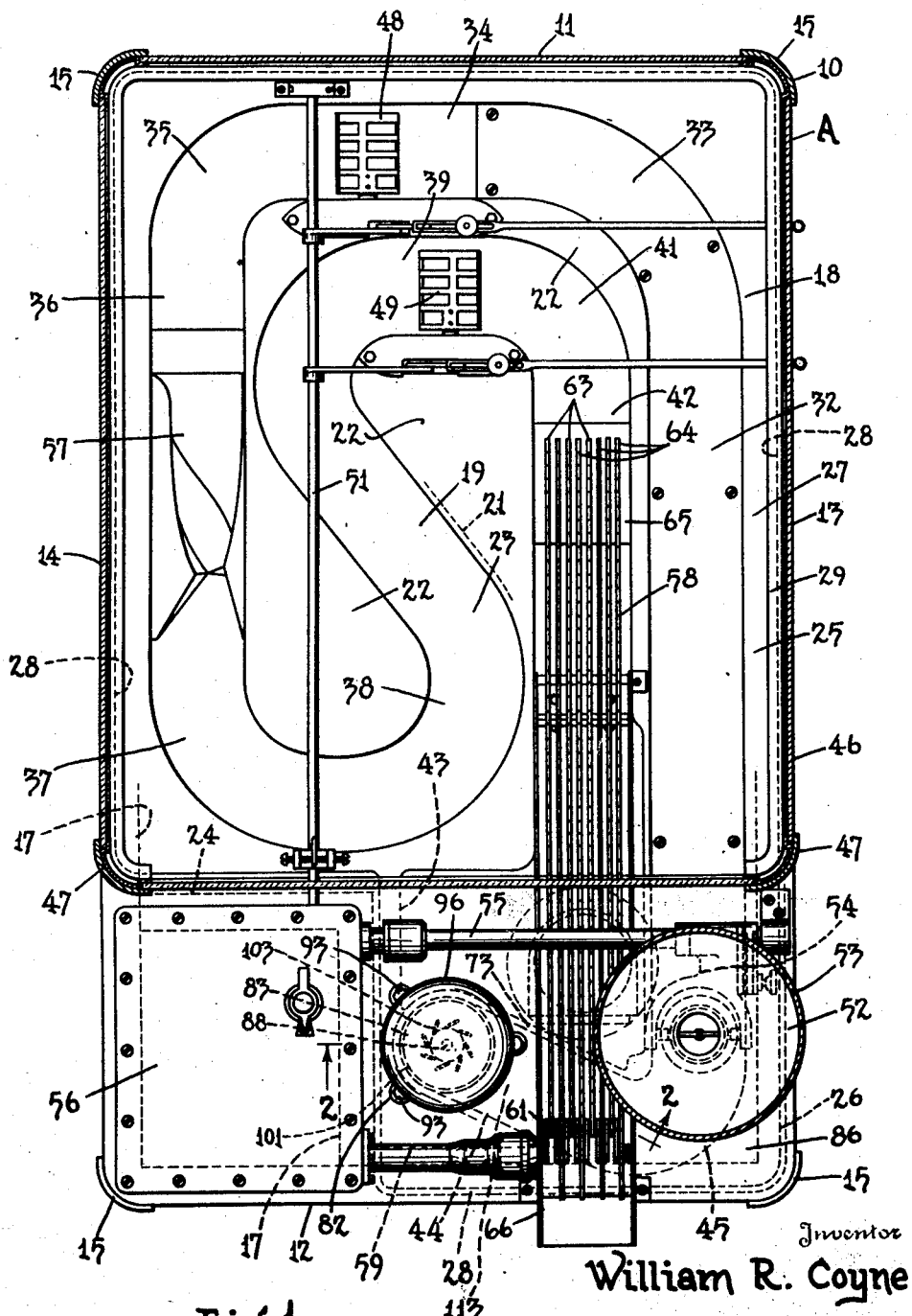

2,362,191

UNITED STATES PATENT OFFICE 2,362,191

DOUGHNUT MACHINE

William R. Coyne, Minneapolis, Minn., assignor to Dough-King, Inc., Minneapolis, Minn., a corporation of Minnesota Application April 5, 1943, Serial No. 481,830

10 Claims. (Cl. 99—406)

My invention relates to doughnut machines and particularly to doughnut machines in which the doughnuts are progressed along a channel or way in a kettle throughout a circuitous course by means of the flow of the cooking liquid.

An object of the invention resides in providing a doughnut machine of such character in which the rate of circulation of the cooking liquid is accurately controlled.

Another object of the invention resides in providing a simple and practical construction for the positive and effective circulation of the cooking liquid.

A feature of the invention resides in providing a motor for operating the circulating device of the invention and in constructing the circulating device so that the same will function with a relatively high speed motor.

An object of the invention resides in constructing the circulating device with an impeller immersed within the liquid and carried by a vertically extending shaft projecting out of the liquid and to which the motor is attached.

Another object of the invention resides in providing an impeller having blades arranged to act upon the cooking liquid in the manner of a cam or wedge.

A still further object of the invention resides in constructing the impeller with one or more blades arranged in an up and down direction and with the innermost edge of each blade in advance of a radius extending through the outermost edge of the blade.

Another object of the invention resides in providing a plate having an inlet opening and extending across the way or channel in the cooking kettle and in disposing the impeller adjacent said opening.

An object of the invention resides in adjustably mounting the impeller for movement toward and from said blade to vary the volume of the cooking liquid moved by the propeller and the resulting rate of travel of the circulating liquid in the channel.

Other objects of the invention reside in the novel combination and arrangement of parts and in the details of construction hereinafter illustrated and/or described.

In the drawings:

Fig. 1 is a plan sectional view of a doughnut machine illustrating an embodiment of my invention.

Fig. 2 is an elevational sectional view taken on line 2—2 of Fig. 1 and drawn to a greater scale.

Fig. 3 is a plan sectional view taken on line 3—3 of Fig. 2.

In the drawings, I have shown a doughnut machine A which consists of a case 10 constructed with end walls 11 and 12 and side walls 13 and 14 connected therewith. The case includes uprights 15 situated at the outer corners of the same and which extend throughout the height of the case and to which the various walls are attached. The various parts of the doughnut machine are supported on a framework 17, partly shown in Fig. 2. Within the case 10 is disposed a cooking kettle 18 which is supported on the framework 17. The kettle 18 is constructed with a bottom 19 and with vertical walls 21 extending upwardly therefrom. The vertical walls are connected at their upper ends with upper walls 22 and the various walls are so arranged as to form a channel 23 which extends throughout the major portion of the kettle and which provides a way along which the doughnuts may travel. The kettle 18 has one corner of the same removed, as designated at 24, leaving a main portion 25 of the width of the case 10 and of a portion of the length thereof. This construction provides an extension 26 to the kettle which extends up to the end wall 12. Kettle 18 is constructed with a ledge 27 (Fig. 2) extending about the margin of the same which terminates in a lip 28 projecting upwardly from the extreme edge thereof. A guard 29 on the case 10 issues inwardly from the walls thereof and overlies the lip 28, thereby protecting the same and at the same time being spaced therefrom to retard the transmission of heat from the kettle to the case. The kettle 18 is supported on the framework 17 by means of screws 30 which are threaded into bosses 31 formed on said kettle.

The channel 23 is arranged to provide a straight run 32 which commences in the extension 26 and follows along the wall 13 in close proximity thereto. The channel 23, at the end of the run 32, makes a curve 33 which leads into a transverse run 34 extending along the wall 11. This run connects with a sharp curved portion 35 which, in turn, is connected to another straight run 36. The run 36 follows closely along the wall 14. The run 36 is connected to a curved run 37 extending up to the end of the major portion 25 of the kettle at the corner 24 thereof. The run 37 is connected to an S-shaped run 38, generally extending longitudinally of the kettle and disposed adjacent the run 36 and extending in the opposite direction. The S-shaped run 38 is connected with another transverse run 39 which follows along the run 34. Run 39 is connected through a sharp curved portion 41 with another longitudinal run 42 disposed adjacent the run 32 and extending in the opposite direction therefrom. The run 42 discharges into a reservoir 43 which is merely an enlargement of said run. From this reservoir, a short run 44 is provided which is connected by means of a curved run 45 with the beginning of the run 32. A portion of the reservoir 43, the run 44 and the run 45 and the beginning of the run 32 are all disposed in the extension 26 of kettle 18.

The major portion of the kettle 18 is enclosed by means of a hood 46. This hood utilizes the uprights 15 at the end wall 11 and two other uprights 47 which are attached to the case at the locality of the end of the portion 25 thereof. The construction of the hood 46, not forming any particular feature of the invention, has not been shown in detail, though it can be readily comprehended that any suitable construction may be used for the purpose.

Situated at the beginning of the run 32 of channel 23 is a doughnut former 52 comprising a receptacle 53 for raw dough and a suitable cutter 54 connected therewith. This construction being well known in the art, will not be described in detail in this application. The cutter 54 is periodically operated by means of a shaft 55 which is driven by transmission not shown in the drawings, but contained within a case 56 situated in the corner 24 of kettle 18.

In the run 36 of the kettle 18 is arranged a twisted tubular turner 57. This turner inverts the doughnuts after the same have been cooked a predetermined length of time, so that said doughnuts may be cooked equally on both sides thereof. Such devices being well known in the art, the turner 57 will not be described in detail in this application.

For removing the cooked doughnuts from the machine, an ejector 58 is employed which is disposed in the run 42 in the channel 23. This ejector comprises a shaft 59 which is continuously driven from the transmission within the housing 56. This shaft has mounted on it a number of cranks 51. A set of toothed blades 63 are mounted on the ends of said cranks and are adapted to be alternately raised and lowered as the shaft rotates. A corresponding set of blades 64 are mounted on the shaft proper and remain stationary. The lower ends of all of the blades rest upon a rest 65 which is mounted on the bottom of the kettle 18. It will readily be comprehended that as the doughnuts reach the said blades, the doughnuts are elevated and progressed upwardly and outwardly of the kettle 18. The ejector 58 is disposed within a trough 66 which returns any cooking liquid removed from the doughnuts back into the kettle 18 and which also discharges the doughnuts from the machine.

In the runs 34 and 39 of the kettle 23 are mounted two control devices 48 and 49. These control devices are operated by a shaft 51 driven from the transmission within the case 56. These control devices control the rate of travel of the doughnuts to the turner 57 and to the ejector 58 respectively. Such devices, not forming any particular feature of the invention, have not been shown in detail in this application.

The bottom 19 of channel 23 slopes downwardly in a direction away from the doughnut former 52, being at a higher elevation at the beginning of the channel, as indicated at 71, in Fig. 2 and being at a lower elevation in the reservoir 43, as indicated at 72. The portion of the wall 21 designated by the reference numeral 73 and forming the run 44 of channel 23 has an opening 74 in the lower portion thereof which brings the beginning and end of the channel into communication. Above this opening, the wall 21 and a wall 75 extending vertically upwardly from the bottom 19, form a well 76 which connects the reservoir 43 with the run 44 of channel 23. The opening 74 in the portion 73 of wall 21 serves as an inlet to the well 76. In the bottom 19 of kettle 18 is formed a ram 77 which connects the wall 75 with the portion 71 of said bottom. Extending across the uppermost portion of the well 76 is a plate 78 which is set into a rabbet 79 formed in the kettle at the uppermost portion of said well. This plate has an opening 81 in it through which the cooking liquid is discharged into the run 44 of the channel 23.

Circulation of the cooking liquid in the channel 23 is procured by means of a circulating device indicated in its entirety by the reference numeral 82. This device comprises an impeller 83 situated immediately above the plate 78, a motor 84 and a transmission mechanism 85 connected therebetween. These parts will now be described in detail.

Overlying the upper portion of the extension 26 of kettle 18 is a cover plate 86. This cover plate has an opening 87 in it superimposing the opening 81 in plate 78 and concentric therewith. The plate 86 is supported on the framework of the invention in any suitable manner. The transmission 85 includes a vertically extending shaft 88 which is contained within a tubular housing 89 extending through the opening 87 and downwardly into the cooking liquid within the portion 44 of channel 23. This housing is formed at its lower end with a bearing 91 in which the lower end of the shaft 88 is rotatably received. The upper end of the housing 89 is attached to a flange 92 which overlies the plate 86 and is secured thereto by means of cap screws 93. The flange 92 has mounted on it a reticulate case 94 which is provided at its upper end with an outwardly extending flange 95. The electric motor 84 is supported on the frame 94 and secured thereto. A reticulate guard 96 is secured to the flange 95 by means of screws 97 and protects and guards the motor 84. Motor 84 has a shaft 98 which is connected by means of a coupling 99 with the upper end of the shaft 88. This coupling is disposed within the case 94.

The impeller 83 is best shown in Fig. 2 and consists of two plates 101 and 102 which are held in spaced relation by means of a number of blades 103 extending between the same and rigidly secured thereto as by brazing or welding. These blades are angularly disposed with relation to the radii passing through the outer edges thereof. The direction of rotation of the shaft 88 is indicated by the arrow in Fig. 3 and it will be noted that the innermost edge 104 of each of said blades is disposed in advance of the radius passing through the outermost edge 105 thereof. This causes the said blades to act as cams or wedges for forcing the cooking liquid outwardly and secure circulation thereof. The impeller 83 is provided with a hub 106 secured to the uppermost plate 101 and having a bore 107 therein through which shaft 88 extends. The hub 106 is adjustably mounted on the end of the shaft 88 by means of a set screw 108 which is threaded into said hub and engages said shaft. A conical deflector 109 on the hub 106 extends into the space between the two plates 101 and 102 and directs the cooking liquid entering the impeller radially toward the blades 103. An opening 111 formed in the plate 102, directly overlies the opening 81 in the plate 78 and is concentric therewith.

In the operation of the device, rotation of the impeller 83 causes the cooking liquid to be impinged on by the blades 103 which force the cooking liquid radially outwardly. It will be noted that the portion 112 of wall 21 which lies in continuation of the well 76 confines the cooking liquid within the impeller 83, so that the same is discharged from the forward portion 113 of the run 44 of channel 23. This causes the cooking liquid to flow up the ramp 77 and into the major portion of the run 44 and from there, on into the run 32 and successively into the other portions of the channel and back into the reservoir. By adjusting the impeller 83 on the shaft 88 vertically, the distance between the lowermost plate 102 of said impeller and the plate 78 at the top of the well 76 can be varied. By means of such variation, the amount of cooking liquid moved by the impeller can be altered to give any desired velocity to the cooking liquid in the channel 23. Thus, the rate of flow in the cooking channel can be fairly accurately controlled, so that sufficient velocity is procured to bring the doughnuts up to the control devices 48 and 49 in the required length of time and without pressure so great as to cause the doughnuts to become flattened or lose their rotundity.

The advantages of my invention are manifest. An extremely simple and practical construction is provided by means of which the cooking liquid in doughnut machines may be circulated. With my invention, a high speed motor may be used without causing undue agitation of the cooking liquid. In a doughnut machine constructed in accordance with my invention, breaking down of the cooking liquid through aeration caused by undue agitation and aeration of the cooking liquid is entirely prevented. Adjustments of the flow of the cooking liquid can be procured by raising the impeller with reference to the dividing plate having the discharge opening. By removal of the circulating means as a unit, the entire device may be readily cleaned and inspected. The impeller, being entirely immersed within the cooking liquid, is not affected by carbon deposits and will operate for an exceedingly great length of time without attention.

Changes in the specific form of my invention, as herein disclosed, may be made within the scope of what is claimed without departing from the spirit of my invention.

Having described my invention, what I claim as new and desire to protect by Letters Patent is:

1. In a doughnut machine, means forming an open way along which the doughnuts are progressed through circulation of the cooking liquid, means forming a vertically extending closed passageway between the beginning and end of said way having a circular outlet, a vertically extending shaft concentric with said outlet, an impeller carried by said shaft and having a plurality of circumferentially disposed blades encircling said outlet at a locality above the same, said blades extending in an up and down direction and being angularly disposed relative to radii extending through the outermost edges thereof, the innermost edges of said blades leading the outermost edges thereof, said blades discharging into the beginning of the way.

2. In a doughnut machine, means forming an open way along which the doughnuts are progressed through circulation of the cooking liquid, means forming a vertically extending closed passageway between the beginning and end of said way having a circular outlet, a vertically extending shaft concentric with said outlet, an impeller carried by said shaft and having a plurality of circumferentially disposed blades encircling said outlet at a locality above the same, said blades extending in an up and down direction and being angularly disposed relative to radii extending through the outermost edges thereof, the innermost edges of said blades leading the outermost edges thereof, said blades discharging into the beginning of the way and a plate at the uppermost ends of said blades, said plate projecting outwardly beyond the outermost edges of said blades.

3. In a doughnut machine, means forming an open way along which the doughnuts are progressed through circulation of the cooking liquid, means forming a vertically extending closed passageway between the beginning and end of said way having a circular outlet, a vertically extending shaft concentric with said outlet, an impeller carried by said shaft and having a plurality of circumferentially disposed blades encircling said outlet at a locality above the same, said blades extending in an up and down direction and discharging laterally into the beginning of said way.

4. In a doughnut machine, means forming an open way along which the doughnuts are progressed through circulation of the cooking liquid, means forming a vertically extending closed passageway between the beginning and end of said way having a circular outlet, a vertically extending shaft concentric with said outlet, an impeller carried by said shaft and having a plurality of circumferentially disposed blades encircling said outlet at a locality above the same, said blades extending in an up and down direction, a ring at the lower ends of said blades, said ring having an opening registering with the outlet of said passageway and forming an inlet to the impeller, said blades discharging laterally into the beginning of said passageway.

5. In a doughnut machine, means forming an open way along which the doughnuts are progressed through circulation of the cooking liquid, the end of the way being at a lower elevation than the beginning of the way, means forming a vertically extending closed passageway disposed at the locality of the end of the way, said passageway having a circular outlet, a ramp leading upwardly from said outlet to the beginning of said way, a vertically extending shaft concentric with said outlet, an impeller carried by said shaft and having a plurality of circumferentially disposed blades encircling said outlet at a locality above the same, said blades extending in an up and down direction, said blades discharging laterally against said ramp to procure propulsion of the liquid to the beginning of the way and circulation along the way.

6. In a doughnut machine, means forming an open way along which the doughnuts are progressed through circulation of the cooking liquid, means forming a vertically extending closed passageway between the beginning and end of said way having a circular outlet, a vertically extending shaft concentric with said outlet, an impeller carried by said shaft and having a plurality of circumferentially disposed blades encircling said outlet at a locality above the same, said blades extending in an up and down direction, said blades having substantially spiralling surfaces extending outwardly in a direction opposite to the direction of rotation of the impeller, said impeller discharging laterally into the beginning of the way.

7. In a doughnut machine, means forming an open way along which the doughnuts are progressed through circulation of the cooking liquid, means forming a vertically extending closed passageway between the beginning and end of said way having a circular outlet, a vertically extending shaft concentric with said outlet, an impeller carried by said shaft and having a plurality of circumferentially disposed blades encircling said outlet at a locality above the same, said blades extending in an up and down direction and a plate at the uppermost ends of said blades, said plate projecting outwardly beyond the outermost edges of said blades and having an under surface beyond the blades lying in a plane at right angles to the axis of said shaft.

8. In a doughnut machine, means forming an open way along which the doughnuts are progressed through circulation of the cooking liquid, means forming a vertically extending closed passageway between the beginning and end of said way having a circular outlet, a vertically extending shaft concentric with said outlet, an impeller carried by said shaft and having a plurality of circumferentially disposed blades encircling said outlet at a locality above the same, said blades extending in an up and down direction, a plate at the uppermost ends of said blades, said plate projecting outwardly beyond the outermost edges of said blades and having an under surface beyond the blades lying in a plane at right angles to the axis of said shaft and means forming a substantially conical surface within the impeller leading up to the plane surface of the plate.

9. Circulating means for doughnut machines in which the doughnuts are progressed along a way through circulation of the cooking liquid, said circulating means including a vertically extending driven shaft, an impeller carried by said shaft and immersed within the cooking liquid, said impeller having a blade arranged in an up and down direction outwardly of the axis of the shaft with opposed edges arranged at different distances from the shaft, the innermost edge of the blade being disposed in advance of a radius extending through the outermost edge of the blade, said blade acting on the cooking liquid to produce minimum circulatory movement thereof and to reduce agitation.

10. Circulating means for doughnut machines in which the doughnuts are progressed along a way through circulation of the cooking liquid, said circulating means including a vertically extending driven shaft, an impeller carried by said shaft and immersed within the cooking liquid, said impeller having a blade arranged in an up and down direction outwardly of the axis of the shaft and formed with a leading and a trailing edge, the leading edge of said blade being disposed inwardly of the trailing edge thereof.

WILLIAM R. COYNE.